United States Patent
Kaminokado (10) Patent No.: US 7,800,277 B2
(45) Date of Patent: Sep. 21, 2010

(54) ENGINE WITH ATTACHED AXIAL GAP TYPE ROTATING ELECTRIC MACHINE

(75) Inventor: Hiroyuki Kaminokado, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 122 days.

(21) Appl. No.: 12/026,538

(22) Filed: Feb. 5, 2008

(65) Prior Publication Data

US 2008/0185205 A1    Aug. 7, 2008

(30) Foreign Application Priority Data

Feb. 6, 2007    (JP) .............................. 2007-026941

(51) Int. Cl.
*H02K 21/24* (2006.01)
*B60W 20/00* (2006.01)

(52) U.S. Cl. ........................ 310/268; 310/191; 310/209; 180/65.21; 180/65.225; 180/65.51

(58) Field of Classification Search ................... 310/90, 310/191, 209, 268, 153; 180/65.21, 65.225, 180/65.51

See application file for complete search history.

(56) References Cited

U.S. PATENT DOCUMENTS

| | | | |
|---|---|---|---|
| 5,751,085 | A | 5/1998 | Hayashi |
| 7,182,167 | B2* | 2/2007 | Sasamoto .................... 180/219 |
| 7,239,032 | B1* | 7/2007 | Wilson et al. .............. 290/36 R |
| 7,255,188 | B2* | 8/2007 | Tsukada et al. ........... 180/65.51 |
| 7,550,894 | B2* | 6/2009 | Hino et al. ................... 310/268 |
| 7,608,972 | B2* | 10/2009 | Aoki et al. ................... 310/257 |
| 2004/0189140 | A1* | 9/2004 | Fukuda et al. ............... 310/261 |
| 2005/0087376 | A1* | 4/2005 | Tsukada et al. ............. 180/65.2 |
| 2006/0091761 | A1* | 5/2006 | Lafontaine et al. .......... 310/261 |
| 2006/0152104 | A1* | 7/2006 | Hino et al. ................... 310/268 |

(Continued)

FOREIGN PATENT DOCUMENTS

CN    2613918 A    4/2004

(Continued)

OTHER PUBLICATIONS

Official Communication issued in corresponding Chinese Patent Application No. 200810005907.1 mailed on Feb. 12, 2010.

*Primary Examiner*—Quyen Leung
*Assistant Examiner*—Terrance Kenerly
(74) *Attorney, Agent, or Firm*—Keating & Bennett, LLP (57) ABSTRACT

A vehicle drive unit includes a crank case with a crank shaft operatively disposed therein and an attached axial gap type rotating machine. The crank shaft is driven via internal combustion to rotate about a center axis. The axial gap type rotating machine includes a rotor fixed to an end of the crank shaft that extends outside of the crank case and a stator fixed to the crank case and facing the rotor. The stator includes a first stator that has first teeth that form the magnetic flux generating area and a second stator that has second teeth. A gap between the first teeth and the second teeth can be varied to vary magnetic resistance by rotating the second stator relative to the first stator. Preferably, a drive mechanism is provided to rotate the second stator relative to the first stator.

30 Claims, 9 Drawing Sheets

U.S. PATENT DOCUMENTS

| | | |
|---|---|---|
| 2006/0185917 A1* | 8/2006 | Ozeki et al. ................ 180/65.2 |
| 2006/0209266 A1* | 9/2006 | Utsunomiya ................ 353/54 |
| 2006/0267436 A1* | 11/2006 | Naito et al. ............ 310/156.32 |
| 2007/0001523 A1* | 1/2007 | Ko et al. ...................... 310/51 |
| 2007/0024137 A1* | 2/2007 | Otsuki et al. ................. 310/90 |
| 2007/0200439 A1* | 8/2007 | Nagahashi et al. ............ 310/54 |
| 2009/0212728 A1* | 8/2009 | Yagi et al. ................... 318/437 |
| 2009/0224625 A1* | 9/2009 | Hino et al. .................. 310/209 |

FOREIGN PATENT DOCUMENTS

| | | |
|---|---|---|
| CN | 1905326 A | 1/2007 |
| EP | 1 705 784 A2 | 9/2006 |
| JP | 2006-271040 | 10/2006 |

* cited by examiner

ENGINE WITH ATTACHED AXIAL GAP TYPE ROTATING ELECTRIC MACHINE

PRIORITY INFORMATION

This patent application is based on and claims priority under 35 U.S.C. §119 to Japanese Patent Application No. 2007-026941, filed on Feb. 6, 2007, the entire contents of which is hereby expressly incorporated by reference.

TECHNICAL FIELD

The present invention relates to a vehicle drive unit, and more particularly to a drive unit including an engine with an attached axial gap type rotating electric machine.

BACKGROUND ART

A known vehicle drive unit that includes an engine with an attached axial gap type rotating electric machine is disclosed in JP-A-20060271040. The disclosed vehicle drive unit is provided with a crank case, a crank shaft that is driven to rotate around a center axis by a piston within the crank case, and an axial gap type rotating electric machine that is operatively connected via a belt-type continuously variable transmission to one end of the crank shaft within the crank case.

The axial gap type rotating electric machine is disposed in parallel to the crank shaft. The electric machine is provided with a rotating shaft that has one end that is linked to the belt-type continuously variable transmission, a rotor that is fixed to the other end of the rotating shaft, and a stator that is fixed to the crank case at a position further toward the other end than the rotor, with the rotating shaft inserted therethrough.

A plurality of permanent magnets is disposed orthogonal to the axial center of the rotating shaft in a surface of the rotor that faces the stator. The stator has a magnetic flux generating area that faces each permanent magnet in the axial direction.

More specifically, the stator includes a first stator that has first teeth that form the magnetic flux generating area, and a second stator that has second teeth that rotate relative to the first teeth around the axial center. The second stator has a structure that allows a gap, which generates magnetic resistance, between the second teeth and the first teeth to be varied.

The first stator is fixed to the crank case, and the second stator is provided with a drive mechanism that causes the second stator to rotate relative to the first stator.

The above-described vehicle drive unit is mounted in a straddle-type vehicle, most typically a motorcycle. Furthermore, the attached axial gap type rotating electric machine of the vehicle drive unit, which can be operated as a generator, can also be used to drive the driving wheel of the straddle-type vehicle. In one case, the axial gap type rotating electric machine may provide an auxiliary drive force to the drive force provided by the crank shaft that is driven to rotate around the axial center by the piston. In another case, the driving wheel of the straddle-type vehicle may be driven only by the axial gap type rotating electric machine.

In the above-described vehicle drive unit, a drive mechanism rotates the second stator, thereby changing the gap that generates the magnetic resistance between the first teeth and the second teeth. As a result, the relationship of the rotational speed and the rotational torque can be controlled. Accordingly, the output characteristics of the axial gap type rotating electric machine can be changed in accordance with the running state of the straddle-type vehicle. For example, the output characteristics can be changed to a high torque low speed mode or a low torque high speed mode.

However, in the above-described vehicle drive unit comprising an engine with an attached axial gap type rotating electric machine, the axial gap type rotating electric machine is operatively connected to the crank shaft of the engine via a belt-type continuously variable transmission, which makes reducing the size of the engine with the attached axial gap type rotating electric machine difficult. As a result, the above-described vehicle drive unit is more difficult to mount in the straddle-type vehicle, etc.

The invention has been devised in light of the above-described circumstances, and it is an object thereof to provide a vehicle drive unit comprising an engine with an attached axial gap type rotating electric machine that is easier to mount in a straddle-type vehicle.

SUMMARY

A vehicle drive unit including an engine with an attached axial gap type electric machine is provided. In one embodiment, the engine has a crank case with a crank shaft operatively disposed therein. The crank shaft is configured to be driven by a piston to rotate about a center axis of the crankshaft. The axial gap type rotating machine comprises a rotor fixed to an end of the crank shaft that extends outside the crank case and a stator fixed to the crank case with the crank shaft inserted therethrough. The rotor includes a plurality of permanent magnets that are orthogonal to the center axis. The stator includes a magnetic flux generating area that faces the permanent magnets in the axial direction. In a preferred embodiment, the stator includes a first stator that has first teeth that form the magnetic flux generating area and a second stator that has second teeth. The gap between the first teeth and the second teeth can be varied to vary magnetic resistance by rotating the second stator around the center axis relative to the first stator so that the second teeth rotate relative to the first teeth. Preferably the vehicle drive unit includes a drive mechanism configured to rotate the second stator relative to the first stator.

In the vehicle drive unit including an engine with an attached axial gap type rotating electric machine of the invention with the above-described structure (hereinafter, "axial gap type rotating electric machine" will be referred to simply as "rotating electric machine"), the stator and the rotor are disposed on an extension line of the center axis of the crank shaft. Thus, size reduction as compared to the known technology can be promoted in which the rotating electric machine is connected to the crank shaft using a belt-type continuously variable transmission or the like.

In addition, in the above vehicle drive unit, because the rotor is disposed further to the outside than the stator, a fan that can blow air can be fixed to the rotor and caused to rotate along with the rotor. Thus, a structure is provided that makes it easier to cool a vehicle drive unit comprising an engine with an attached rotating electric machine while promoting size reduction. It is also easier to cool a radiator that is disposed in the vicinity of the engine of the foregoing vehicle drive unit.

Accordingly, the vehicle drive unit can be mounted extremely easily.

The manner in which the stator is fixed to the crank case includes, in addition to directly fixing the stator to the crank case, indirectly fixing the stator to the crank case via a cover or the like that is included as a component of the crank case.

In a preferred embodiment of the vehicle drive unit of the invention, a stator drive mechanism may be attached to a vehicle body frame or the like, or, alternatively, may be attached to the crank case. If the latter structure is adopted, ease of mounting is improved still further.

The manner in which the stator drive mechanism may be attached to the crank case includes, in addition to directly fixing the drive mechanism to the crank case, indirectly fixing the drive mechanism to the crank case via a cover or the like that is included as a component of the crank case.

Preferably, the rotor of the rotating electric machine has a cup like shape. In one embodiment the cup-shaped rotor comprises a yoke that extends outward from the crank shaft in the radial direction and an outer cylindrical member, extending from an outer periphery edge of the yoke toward the stator and covers at least a section of the outer periphery of the stator. With this structure, the cup shaped rotor covers the gap between the rotor and the stator, and thus it is difficult for foreign objects like dirt or the like to enter in to the gap. Accordingly, durability is substantially improved.

In the vehicle drive unit of the invention, the permanent magnets may be embedded in the rotor and arranged together. However, it is preferable that the permanent magnets are arranged inside the rotor. If a structure is adopted in which the permanent magnets are arranged inside the rotor, it is possible to reliably reduce the size of the gap in the axial direction between the facing permanent magnets and the magnetic flux generating area. Accordingly, it is possible to maximize the performance of the rotating electric machine in the vehicle drive unit of the instant embodiment.

The vehicle drive unit of the invention may further include a gap adjustment mechanism provided between the crank case, the crank shaft, the rotor and the stator, that determines a gap between the permanent magnets and the magnetic flux generating area in the axial direction. If this structure is adopted, it is possible to reliably reduce the occurrence of variation in the gap in the axial direction between the permanent magnets and the magnetic flux generating area of the vehicle drive unit, thereby allowing the performance of the rotating electric machine to be reliably demonstrated to an even higher level.

In a preferred vehicle drive unit, a gap adjustment mechanism includes a first regulation mechanism that regulates a position in the axial direction of the rotor along the crank shaft and a second regulation mechanism that regulates a position in the axial direction of the stator relative to the crank case while providing tolerance for variation in the position in the axial direction of the rotor along the crank shaft. If this structure is adopted, it is possible to reliably reduce the occurrence of variations in the gap in the axial direction between the permanent magnets and the magnetic flux generating area in the vehicle drive unit, thereby allowing the performance of the rotating electric machine to be reliably demonstrated to an even higher level.

In one embodiment, the first regulation mechanism has a structure in which one end of the crank shaft and the rotor are fitted together using a tapered structure, and the second regulation mechanism has a structure that includes a bearing support member that is provided in an outer periphery surface of an inner cylindrical member that protrudes from a center of the rotor toward the stator, a bearing support member that is provided in an inner periphery surface of the stator, a bearing that is provided between the bearing support members, and an engagement pin and an engagement hole, respectively provided in the crank case and the stator, that provide tolerance for mutual movement in the axial direction.

If this structure is adopted, it is possible to reliably reduce the occurrence of variation in the gap in the axial direction between the permanent magnets and the magnetic flux generating area. Note that, in a modified example of the first regulation mechanism, the crank shaft and the rotor can be spline-engaged.

In the vehicle drive unit, it is also preferable if the first stator is fixed to the crank case and the second stator is rotatably provided on the crank case. If this structure is adopted, there is no need to rotate the first teeth, which have a structure that is more complicated than the second teeth and that form the magnetic flux generating area, and thus the device structure of the engine can be simplified.

The vehicle drive unit may also further include a fan that is fixed to and integrated with the outside of the rotor. With such a structure it is easier to cool the engine of the vehicle drive unit using the fan. It is also easier to cool a radiator that is disposed in the vicinity of the fan. In addition, as a result of integrally fixing the fan to the rotor, which is otherwise lighter than the stator, rotational resistance is reduced.

In one embodiment, the fan preferably intakes air from the outside in the axial direction, and blows out air to the outside in the radial direction with respect to the center axis. By adopting this structure, a large intake port can be provided at the lateral extremity of the vehicle drive unit in the vehicle width direction of the straddle-type vehicle or the like in which the vehicle drive unit is mounted, thereby making it easier to intake cool external air that has not been heated by the engine of the vehicle drive unit, and to lead exhausted air to the outside of the vehicle, such as a straddle-type vehicle.

In a preferred embodiment, the fan that intakes air from the outside in the axial direction and then blows the air to the outside in the radial direction with respect to the center axis may be a sirocco fan. However, the fan is not so limited. For example, the fan may be a turbo fan, or a combination of a sirocco fan and a turbo fan.

The vehicle drive unit may also include a radiator. The radiator may be disposed laterally outside of the fan in a fan shroud so that the cooling fan intakes air through the radiator. It is thus possible to improve engine performance using water cooling in a vehicle drive unit with this structure. More particularly, if the fan is of a type that intakes air from the outside in the axial direction, cool external air can be caused to hit the radiator, thereby effectively cooling the radiator.

In another aspect of the invention, a vehicle drive unit for a straddle-type vehicle is provided comprising an internal combustion engine including a crank case having a crank shaft, the crank shaft being mounted within the crank case so that an extended portion of the crank shaft extends outside of the crank case and the crank shaft can rotate about a center axis. The vehicle drive unit further includes an axial gap type rotating electric motor operatively coupled to the extended portion of the crank shaft along the center axis to facilitate engine size reduction and mounting of the vehicle drive unit on a straddle-type vehicle.

In yet another aspect of the invention, the vehicle drive unit, comprises a crank case and a crank shaft operatively inserted in the crank case. The crank shaft is driven via internal combustion to rotate about a center axis therein and has an extended portion that is disposed outside of the crank case. The vehicle drive unit also includes a stator assembly comprising a first stator component fixed to the crank case and a second stator component configured to move relative to the first fixed stator component, a drive mechanism for the second stator component, and a rotor operatively disposed adjacent the first stator component and being coaxially fixed to the extended portion of the crank shaft along the center axis.

In still a further aspect of the invention, a straddle-type vehicle is provided with a vehicle drive unit comprising an engine with an attached rotating electric machine mounted thereon.

DETAILED DESCRIPTION

Hereinafter, a concrete embodiment of the invention will be described with reference to the drawings. The detailed description set forth below in connection with the appended drawings is intended, however, only as a description of an exemplary embodiment and is not intended to represent the only embodiment that may be constructed and/or utilized.

FIGS. 1-4 schematically illustrate a vehicle drive unit 50 which includes an internal combustion engine with an operatively attached axial gap type rotating electric machine mounted in a motorcycle 1. In other embodiments, drive unit 50 may be mounted in other straddle-type vehicles.

Figure 1:
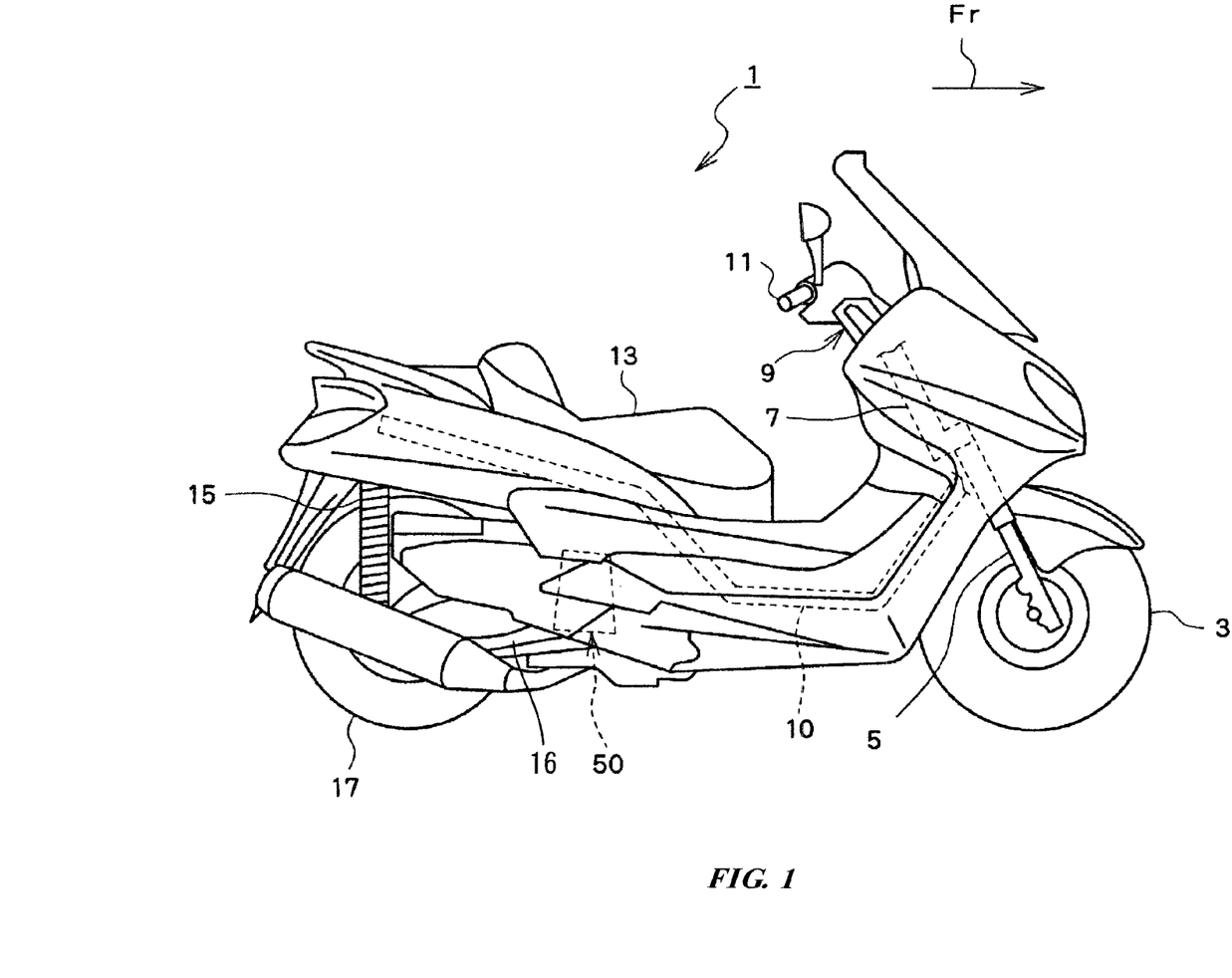
FIG. 1 is a side view of a motorcycle with a drive unit including an engine with an attached axial gap type rotating electric machine according to one embodiment.

The motorcycle 1, as shown in FIG. 1, is provided with a front wheel 3 at a vehicle body front lower section and a rear wheel 17. The front wheel 3 is rotatably supported by a lower end section of a front fork 5. A steering shaft 7 that extends upwards is connected to an upper end section of the front fork 5. A handlebar 9 that extends in the vehicle width direction is attached to an upper end section of the steering shaft 7. Grips 11 are attached to either end of the handlebar 9. A vehicle body frame 10 is attached to a central section of the steering shaft 7.

The vehicle body frame 10 extends diagonally downward toward a vehicle body rear section, and then curves to extend horizontally. Then, the vehicle body frame 10 curves again before extending in a generally straight direction. A seat 13 is disposed on a rear upper side of the vehicle body frame 10. An upper end section of a rear suspension 15 is operatively connected to a rear end section of the vehicle body frame 10.

Figure 2:
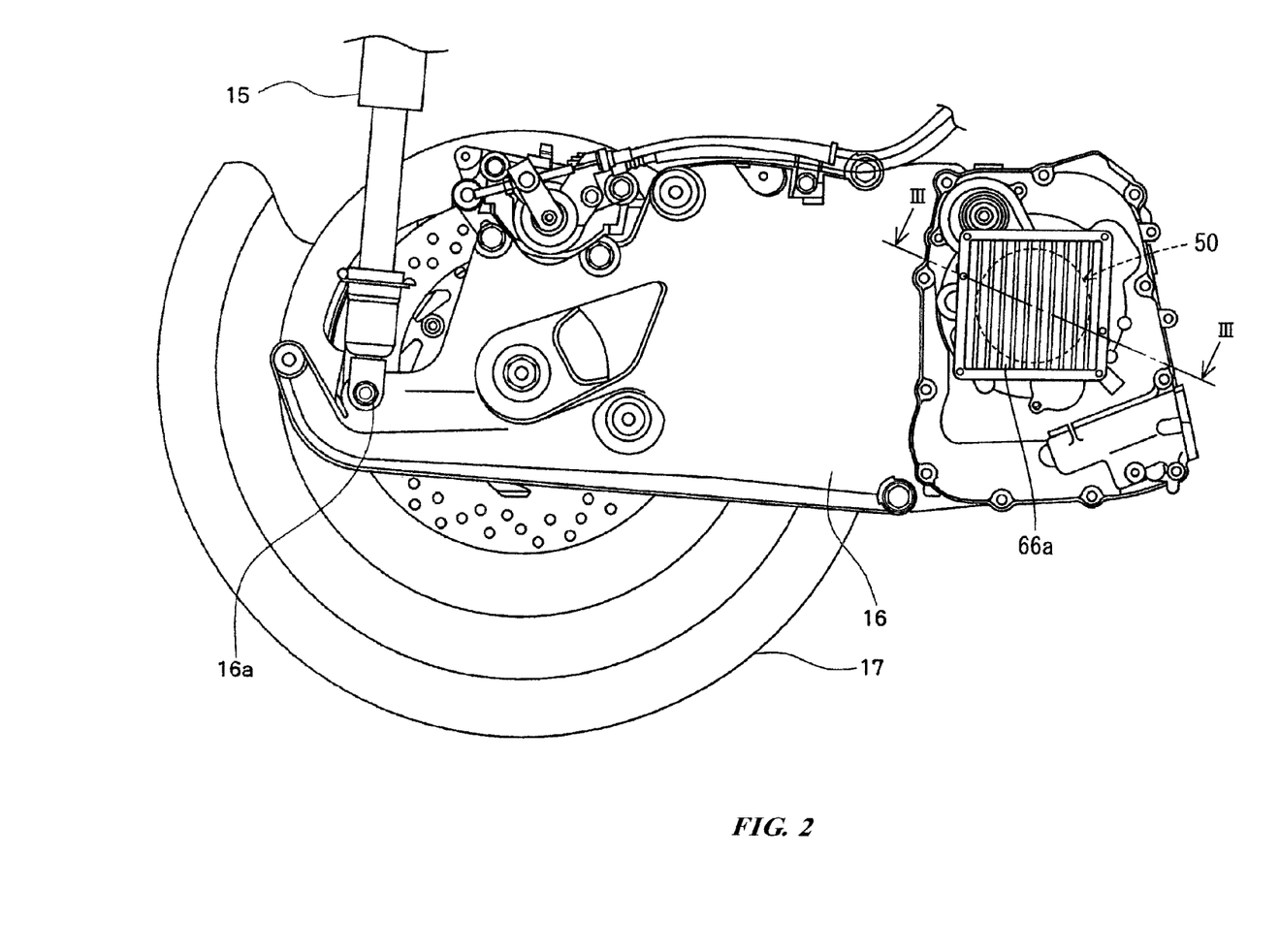
FIG. 2 is an enlarged side elevational view of a rear section of the motorcycle of FIG. 1 showing the drive unit.

As can be seen from FIG. 2, a lower end section of the rear suspension 15 is connected to a rear end section 16a of a rear swing arm 16, which constitutes one section of the vehicle body frame 10. The rear arm 16 rotatably supports rear wheel 17. The driving force produced by the drive unit 50 is transmitted to the rear wheel 17 via a drive force transmission mechanism such as a belt-type continuously variable transmission, thereby rotatably driving the rear wheel 17. The drive unit 50 is disposed generally beneath the central section of the vehicle body frame 10.

Figure 3:
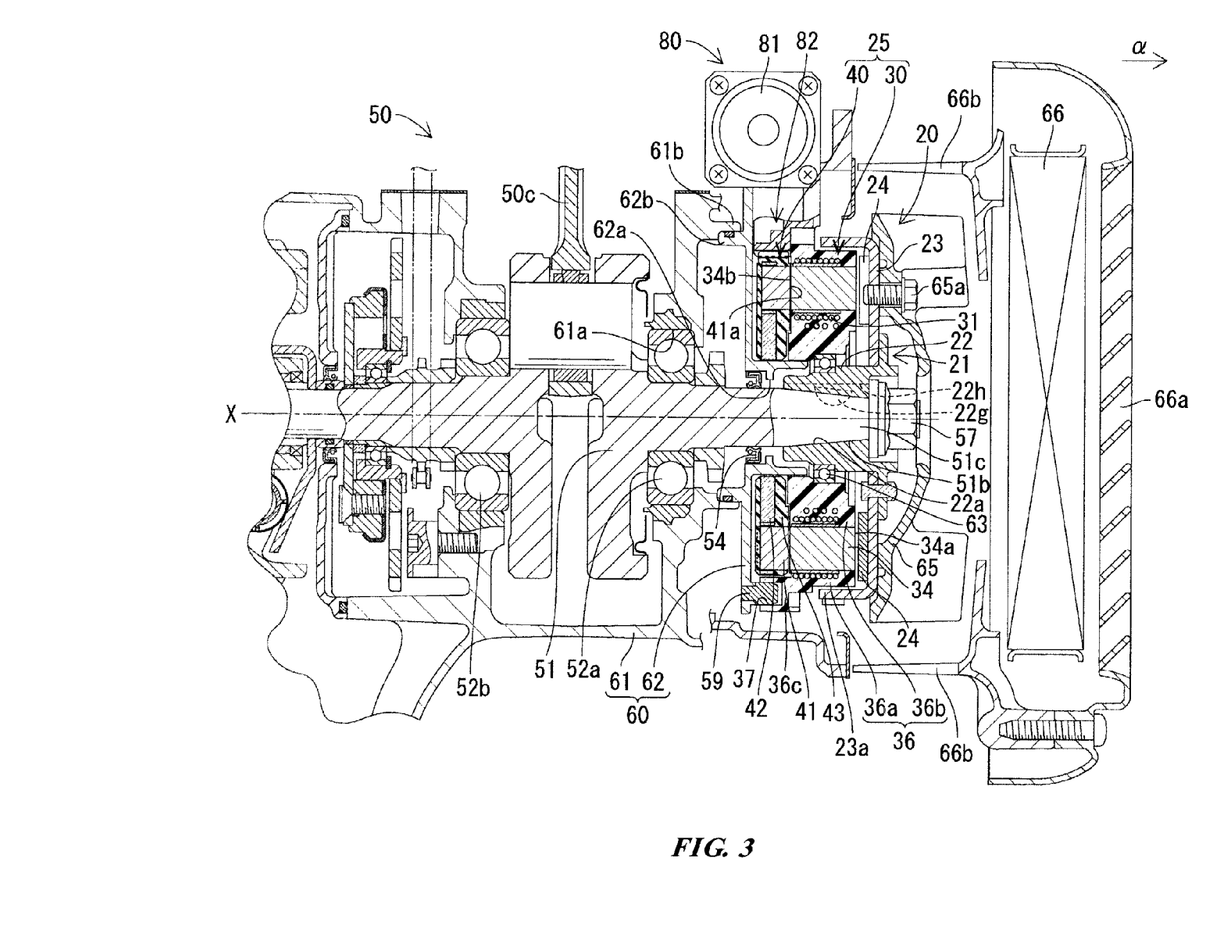
FIG. 3 is a cross-sectional view of the motorcycle drive unit taken along line III-III of FIG. 2.

As shown in FIG. 3, vehicle drive unit 50 is provided with a crank case 60, a crank shaft 51, and an axial gap type rotating electric machine 20 (hereinafter simply referred to as "rotating electric machine 20").

The crank case 60 includes a crank case body 61, and a crank case cover 62 that is positioned to the outside in the lateral (vehicle width) direction (the direction indicated by α shown in FIG. 3) of the crank case body 61. The crank case cover 62 has a generally flat tabular shape. In other embodiments, however, other suitable configurations for crank case cover 62 may be utilized as needed. An engagement member 62b is formed on the interior side of the crank case cover 62 so that it projects inwardly in the vehicle width direction (the direction opposite to that indicated by α in FIG. 3). The engagement member 62b is fitted into a mating engaged member 61b that is formed on the exterior of the crank case body 61 so that it projects outwardly in the vehicle width direction. As a result, the crank case cover 62 is assembled as an integrated unit with the crank case body 61.

A first insertion aperture 61a that has a center axis that is aligned with a center axis X of the crank shaft 51 is formed in the outside in the vehicle width direction of the crank case body 61. A second insertion aperture 62a that has a center axis that is aligned with the center axis X is also formed in the crank case cover 62.

The crank shaft 51 is operatively disposed inside the crank case body 61, and is connected via a connecting rod 50c to a piston (not shown in the figures) that is housed within a cylinder (not shown in the figures) that is provided in a central section of the engine of vehicle drive unit 50. An end section 51c of crank shaft 51 extends through the insertion apertures 61a, 62a, and thus protrudes further to the outside in the vehicle width direction than the second insertion aperture 62a.

A bearing 52a that rotatably supports the crank shaft 51 such that it rotates around the center axis X is disposed between the crank shaft 51 and the first insertion aperture 61a. In addition, a bearing 52b that rotatably supports the crank shaft 51 such that it rotates around the center axis X is provided in the crank case body 61. As a result, the crank shaft 51 is driven to rotate around the center axis X inside the crank case 60 by the up-down motion of the piston. Moreover, a seal member 54 that seals a gap between the crank shaft 51 and the crank case 60 is provided between the crank shaft 51 and the second insertion aperture 62a.

The rotating electric machine 20 is disposed outside of the crank case 60 in the vehicle width direction. The rotating electric machine 20 is provided with a rotor 21, a stator 25, and a drive mechanism 80.

Figure 4:
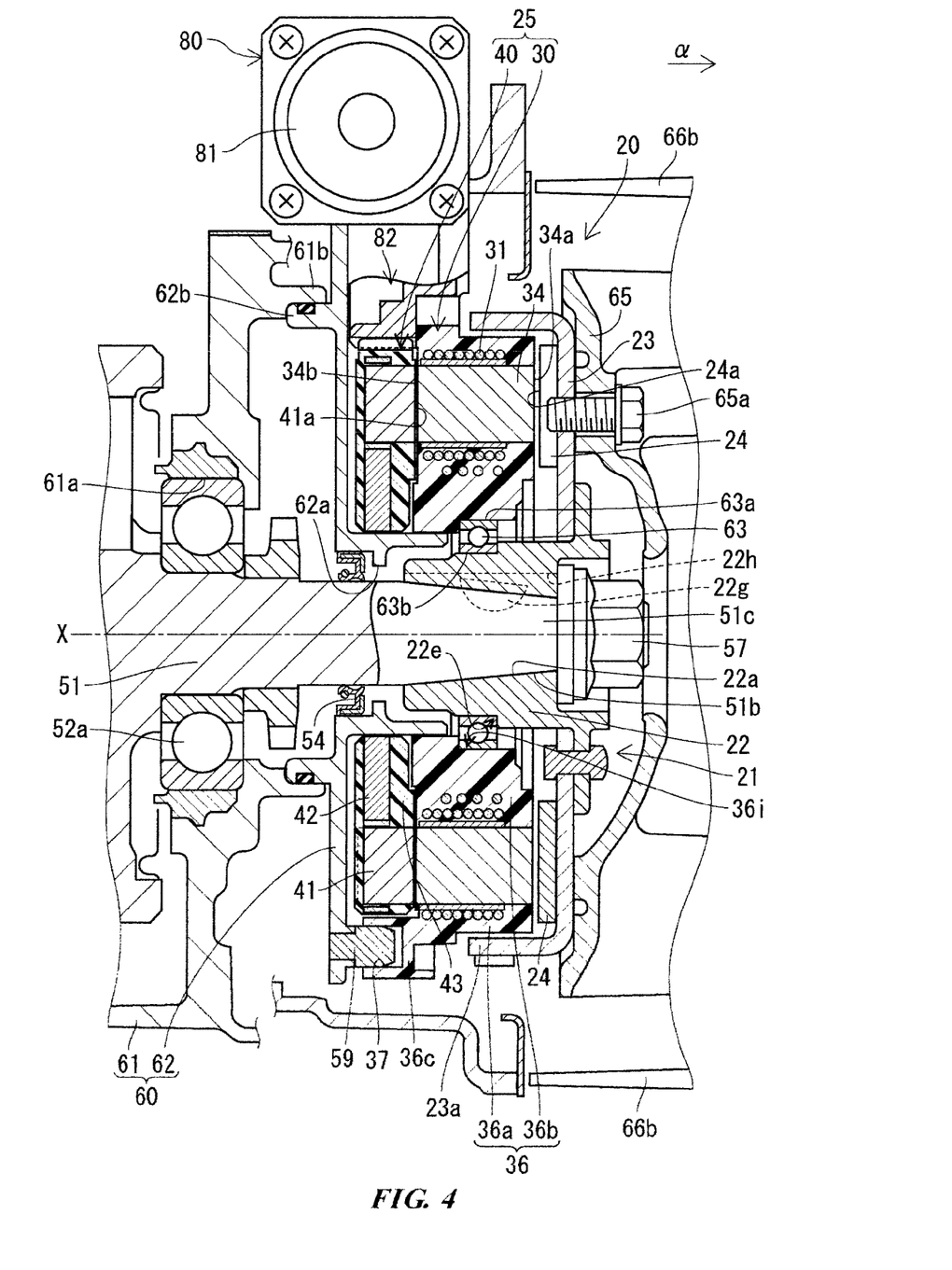
FIG. 4 is an expanded cross-sectional view of a portion of the drive unit of FIG. 3.

The rotor 21, as can be seen from FIG. 4, includes an inner cylindrical member 22, a yoke 23, and an outer cylindrical member 23a. An inner periphery surface of the inner (small diameter) cylindrical member 22 has a tapered surface 22a that has a diameter that becomes smaller as the tapered surface 22a extends toward the end of crank shaft 51 in the vehicle width direction. Similarly, a mating outer periphery surface of the end section 51c of the crank shaft 51 is formed with a tapered surface 51b that has a diameter that becomes smaller as the tapered surface 51b extends toward the end of crank shaft 51 in the vehicle width direction. Accordingly, when the inner cylindrical member 22 of the rotor 21 is fitted to the end section 51c of the crank shaft 51, the tapered surface 51b is placed in frictional contact with the tapered surface 22a. In addition, a nut 57 is screwed on to a threaded section formed in the end section 51c. The nut 57 presses the rotor 21 toward the central section of the crank shaft 51, whereby the tapered surface 51b and the tapered surface 22a are held together under pressure. As a result of adopting this structure, the rotor 21 is fixed to the end section 51c side of the crank shaft 51, and the position of the rotor 21 along the center axis X direction with respect to the crank shaft 51 is determined.

In the present embodiment, the structure in which the end section 51c of the crank shaft 51 and the rotor 21 are fitted together using tapered surfaces, namely using the tapered surface 51b and the tapered surface 22a, corresponds to a first regulation mechanism that regulates the position of the rotor 21 in the center axis X direction on the crank shaft 51. In addition, with the first regulation mechanism, there is a possibility that variation in the position of the rotor 21 on the crank shaft 51 in the center axis X direction may occur as a result of the characteristics of the taper fit. However, a second regulation mechanism described later is structured so as to provide tolerance for such variation.

A groove 22h that extends in the center axis X direction is formed in the tapered surface 22a of the inner cylindrical member 22. On the other hand, a recess having a semicircular shape is formed in the tapered surface 51b of the end section 51c of the crank shaft 51. A key 22g with a corresponding shape is fitted in to this recess. Key 22g in configured so that an edge of the key 22g protrudes from the tapered surface 51b, and engages with the groove 22h. As a result of adopting this structure, the key 22g is engaged with both the rotor 21 and the crank shaft 51, thereby providing a structure that ensures that the rotor 21 rotates along with the crank shaft 51.

The yoke 23 has a generally disk like shape that extends from the small diameter cylindrical member 22 in the radial direction. In addition, a plurality of permanent magnets 24 (field magnets) are mounted on the inside of yoke 23 in the vehicle width direction. Permanent magnets 24 are arranged in a circular manner while being orthogonal to the center axis X.

The outer cylindrical member 23a encloses at least a section of the outer periphery of the stator 25, described hereinafter, and extends toward the crank case 60 in the vehicle width direction from an outer periphery edge of the yoke 23. Due to providing the yoke 23 and the outer cylindrical member 23a, the rotor is cup shaped. As a result, a gap between the rotor 21 and the stator 25 is covered. Accordingly, it is difficult for foreign objects like dirt or the like to enter in to the gap between the rotor 21 and the stator 25.

In the present embodiment, a cooling fan 65 that functions as a fan that can generate air flow is integrally fixed by a bolt 65a to the outside of the yoke 23 in the vehicle width direction. The cooling fan 65 of the present embodiment is a sirocco fan that is thin in the center axis X direction. The cooling fan 65 is formed by a plurality of integrated vanes that are configured to intake air from the outside of drive unit 50 in the center axis X direction and blow out the air to the outside in the radial direction with respect to the center axis X.

As can be seen from FIG. 3, a radiator 66 is disposed to the outside in the vehicle width direction of the cooling fan 65. The radiator 66 is assembled together with a support member (not shown in the figures) that extends toward the outside in the vehicle width direction from the crank case 60. A large intake port 66a is disposed at the outside in the vehicle width direction of the radiator 66. Cool external air, which enters via the intake port 66a from the outside in the vehicle width direction as a result of rotation of the cooling fan 65, directly hits the radiator 66. As a result, coolant that circulates between the radiator 66 and a cylinder block (not shown in the figures) of the engine 50 is effectively cooled. In addition, a discharge port 66b is provided in the radial direction of the cooling fan 65. Air that is discharged from the cooling fan 65 to the outside in the radial direction can be smoothly discharged to the outside of the vehicle drive unit 50. Note that, hypothetically speaking, if the blow direction of the cooling fan 65 is reversed, air that is warmed by the heat of the engine in the drive unit 50 hits the radiator 66, whereby cooling efficiency is lowered. However, the above-described structure eliminates the possibility of this type of problem occurring.

The stator 25 is fixed to the outside of the crank case 60 in the vehicle width direction with the crank shaft 51 inserted therethrough. Thus, the stator 25 is disposed further to the inside in the vehicle width direction than the rotor 21. In addition, the stator 25 has an end surface (magnetic flux generating area) 34a that faces each of the permanent magnets 24 in the center axis X direction.

More specifically, the stator 25 is provided with a fixed stator 30 that functions as a first stator that is positioned on the rotor 21 side, and a moveable stator 40 that functions as a second stator that is positioned at the crank case cover 62 side.

Figure 5:
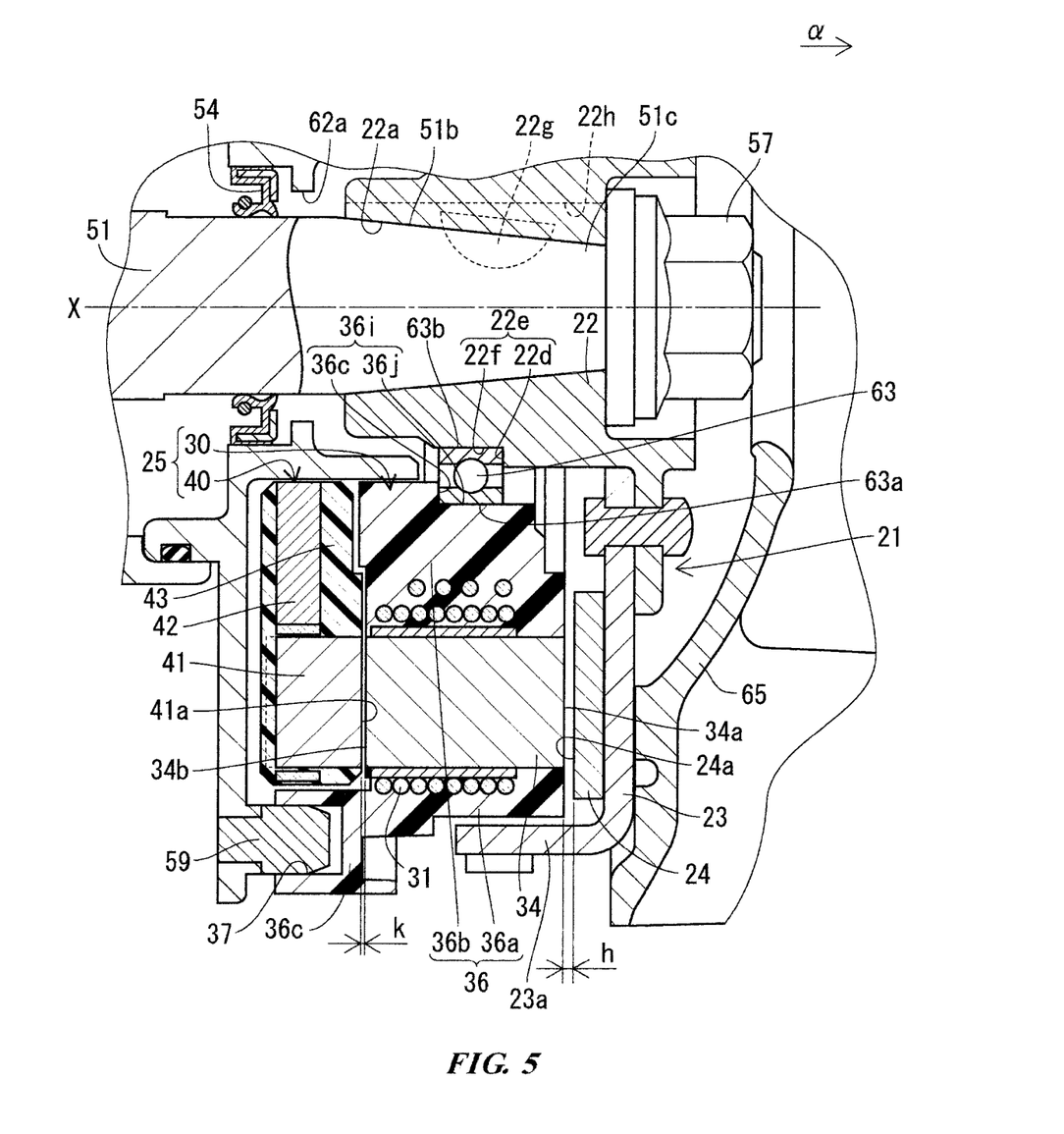
FIG. 5 is an expanded cross-sectional view of a portion of the stator of the drive unit shown in FIGS. 3 and 4.

As can be seen from FIG. 3 to FIG. 5, the fixed stator 30 is provided with a plurality of first teeth 34 formed by magnetic cores. Each first tooth 34 is arranged in a ring like shape that encircles the crank shaft 51. The end surface (magnetic flux generating area) 34a of each first tooth 34 at the rotor 21 side faces each permanent magnet 24 of the rotor 21.

A coil 31 that generates a magnetic flux when energized is wound around each first tooth 34. The first teeth 34 and the coil 31 are molded into a resin member 36 that is made from resin and that includes a lubricant. The resin member 36 is formed in a ring like shape that centers on the center axis X. As shown in the enlarged view of FIG. 5, the resin member 36 has an inner periphery section 36b that is generally cylindrical and positioned radially inward of a coil group that is made up of a plurality of coils 31. In addition, the resin member 36 has an outer periphery section 36a that is generally cylindrical and positioned radially outward of the coil group that is made up of the plurality of coils 31.

The outer periphery section 36a has an annular protrusion 36c that extends toward the crank case cover 62 (in the vehicle width direction). A plurality of engagement holes 37 are formed in an end surface of the protrusion 36c at the crank case cover 62 side (the inside in the vehicle width direction) and extend parallel with the center axis X. A plurality of mating engagement pins 59 that protrude toward the outside in the vehicle width direction are formed at positions that correspond with the respective engagement holes 37 on the crank case cover 62 such that the engagement pins 59 can fit into the respective engagement holes 37. In addition, each engagement pin 59 is fitted into each engagement hole 37 so that the fixed stator 30 is fixed to the crank case cover 62 so as not to be capable of rotation around the center axis X. The depth of each engagement hole 37 is made larger than the protrusion length of each engagement pin 59. Therefore, the relative position of each engagement hole 37 and each engagement pin 59 is not restricted in the center axis X direction.

A radial bearing 63 is disposed between an inner periphery surface of the inner periphery section 36b and an outer periphery surface of the inner cylindrical member 22.

More particularly, a bearing support member 36i is provided in the inner periphery surface of the inner periphery section 36b. This bearing support member 36i includes a bearing contact surface 36j and a bearing support surface 36c. The bearing support surface 36c is formed to be perpendicular to the center axis X, so that it faces the rotor 21. The bearing support surface 36c is positioned in the vicinity of a center point between an end section of the inner periphery section 36b at the rotor 21 side and an end section of the inner periphery section 36b at the moveable stator 40 side. The bearing contact surface 36j is formed to have a cylindrical shape that is concentric with the center axis X, and contacts an outer periphery surface 63a of the radial bearing 63.

In addition, a bearing support member 22e is formed at an outer periphery side of the inner cylindrical member 22. The bearing support member 22e includes a bearing contact surface 22f and a bearing support surface 22d. The bearing support surface 22d is formed to be perpendicular to the center axis X, so that it faces the fixed stator 30. The bearing support surface 22d is positioned in the vicinity of a center point in the center axis X direction of the inner cylindrical member 22. The bearing contact surface 22f is formed to have a cylindrical shape that is concentric with the center axis X, and contacts an inner periphery surface 63b of the radial bearing 63.

The radial bearing 63 is disposed between the bearing support surface 36c and the bearing support surface 22d in the center axis X direction. Note that, in the above explanation, because the respective engagement holes 37 and the engagement pins 59 do not have their respective relative positions in the center axis X direction regulated, the fixed stator 30 is pulled toward the rotor 21 side by magnetism of the permanent magnets 24. At this time, the bearing support surface 22d supports the fixed stator 30 via the radial bearing 63 and the bearing support surface 36c in resistance to the attracting force (the magnetism). As a result, a gap h is maintained between the facing surface 24a of each permanent magnet 24 that faces the fixed stator 30 and the end surfaces (the magnetic flux generating area) 34a of the first teeth 34 that face the permanent magnets 24. Note that, the gap h is more specifically the gap between each permanent magnet 24 and the end surfaces (the magnetic flux generating area) 34a in the center axis X direction. The gap h can be determined by the position of the bearing support surface 36c of the fixed stator 30, the width of the radial bearing 63 in the center axis X direction, and the position of the bearing support surface 22d of the small diameter cylindrical member 22.

In addition, the radial bearing 63 is in contact with both the bearing contact surface 36j of the fixed stator 30 and the bearing contact surface 22f of the inner cylindrical member 22. Thus, the radial bearing 63 can provide support such that relative rotation is possible, without causing misalignment of the fixed stator 30 or the rotor 21 in the radial direction.

The radial bearing 63, the bearing support member 36i of the fixed stator 30, the bearing support member 22e of the inner cylindrical member 22, the engagement holes 37, and the engagement pins 59 correspond to a second regulation mechanism that permits variation in the position in the center axis X direction of the rotor 21 along the crank shaft 51, but regulates the position in the center axis X direction of the stator 25 relative to the crank case 60. In addition, the second regulation mechanism and the above-described first regulation mechanism form a gap adjustment mechanism that determines the gap h in the center axis X direction between the permanent magnets 24 and the end surfaces (magnetic flux generating area) 34a.

Next, the moveable stator 40 will be explained. The moveable stator 40, as described above, is disposed closer to the crank case cover 62 than the fixed stator 30 and with respect to the rotor 21. The moveable stator 40 also faces the fixed stator 30.

The moveable stator 40 is provided with second teeth 41, and a ring shaped base 42. The number of provided second teeth 41 is the same as the first teeth 34. The base 42 supports the second teeth 41 that are arranged in a ring like shape concentric with the center axis X. The base 42 and the second teeth 41 are molded into a resin member 43 that is made from resin and that includes a lubricant. Each second tooth 41 is formed by a magnetic core. Magnetism generation by energization of the coil 31 exerts a force that pulls the second teeth 41 toward the first teeth 34 side. However, a holding member (not shown in the figures) holds the second teeth 41 such that there is a determined distance of separation from the first teeth 34 in the center axis X direction. In addition, the moveable stator 40, as described below, is capable of relative rotation with respect to the fixed stator 30 around the center axis.

Figure 6:
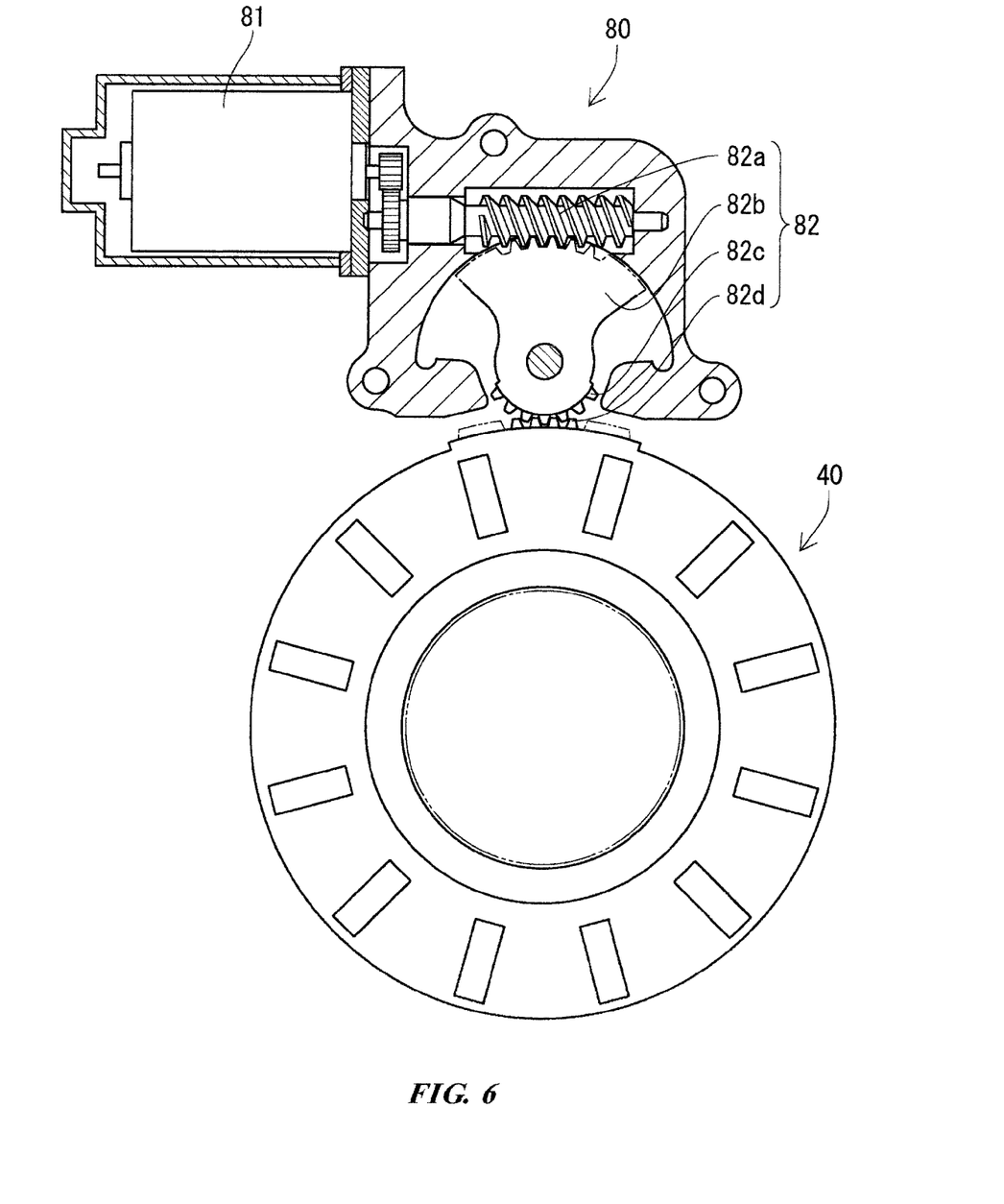
FIG. 6 is a schematic outline view of one embodiment of a stator drive mechanism that may be included in a drive unit according to the present patent document.

In one embodiment, a drive mechanism 80, as can be seen from FIG. 4 and FIG. 6, is disposed at the outside of the crank case cover 62 in the vehicle width direction, and to the outside of the moveable stator 40 in the radial direction. The drive mechanism 80 includes a drive motor 81 and a gear mechanism 82. The gear mechanism 82 includes a worm gear 82a, a worm wheel 82b, and a missing tooth gear 82c. When the drive motor 81 rotates, as shown in FIG. 6, the worm wheel 82b rotates within a determined angular range, and a driving force is transmitted to a missing tooth gear 82d that is formed on a section of the outer periphery surface of the moveable stator 40 via the missing tooth gear 82c. As a result, in the drive mechanism 80, when the drive motor 81 rotates in the forward or reverse direction, the moveable stator 40 rotates around the center axis X, and rotates relative to the fixed stator 30.

In the rotating electric machine 20 with the above-described structure, relative rotation of the moveable stator 40 and the fixed stator 30 causes change in output characteristics as described below. Thus the output characteristics of rotating electric machine 20 can be changed between a high torque low speed mode and a low torque high speed mode.

Figure 7:
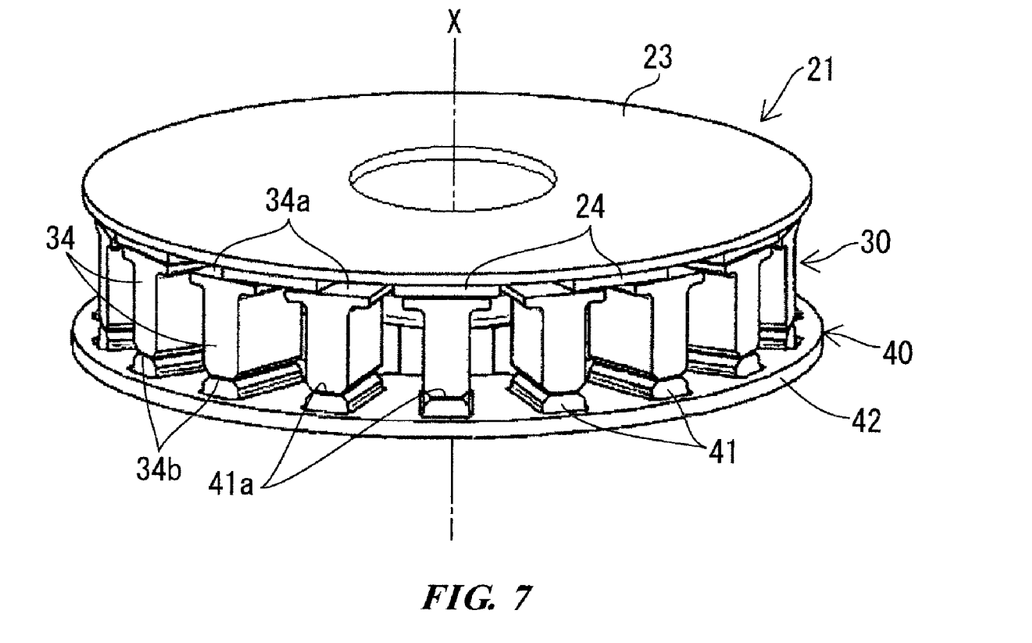
FIG. 7 is a perspective view of a first rotational disposition of the two stator components of the stator of FIG. 5.
Figure 8:
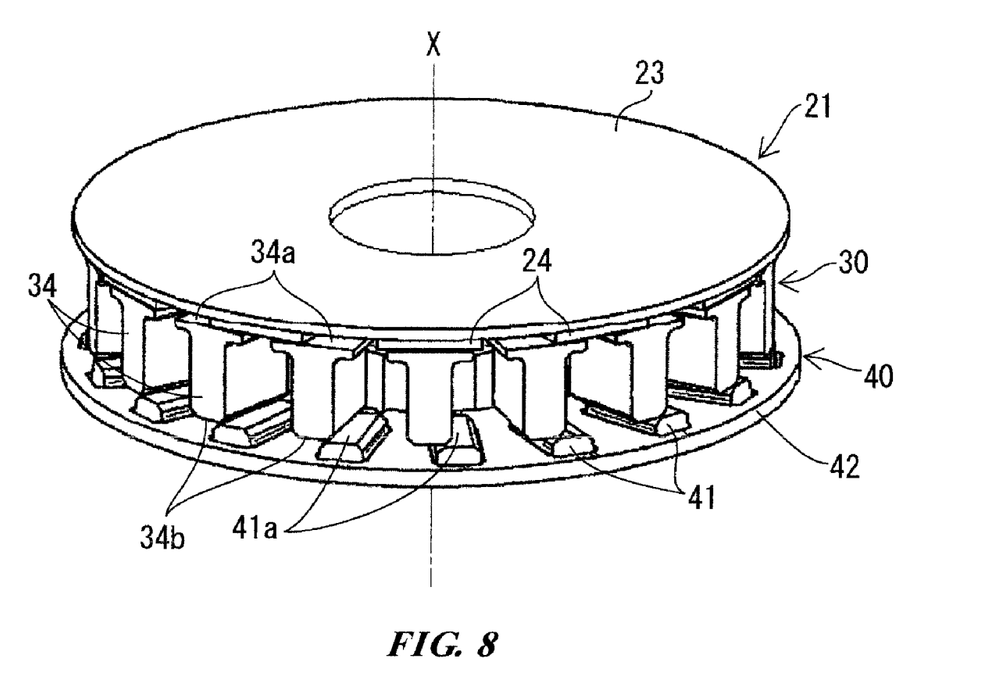
FIG. 8 is a perspective view of a second rotational disposition of the two stator components of FIG. 5.
Figure 9:
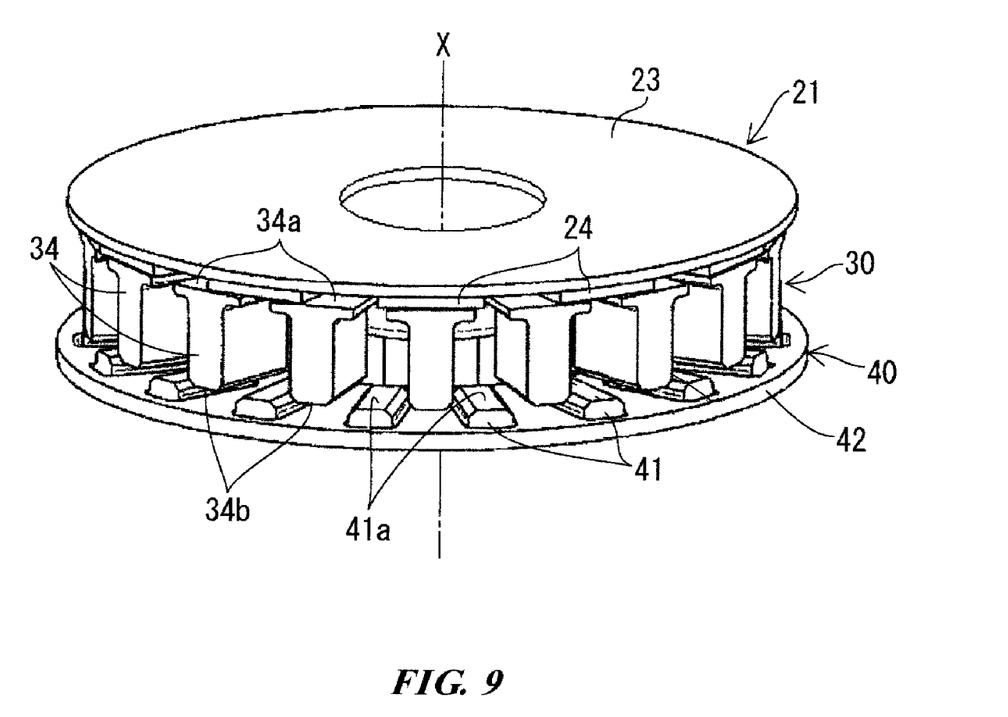
FIG. 9 is a perspective view of a third rotational disposition of the two stator components of FIG. 5.

FIG. 7 to FIG. 9 schematically show different states when the moveable stator 40 is rotated relative to the fixed stator 30 around the center axis X. Note that, for the sake of explanatory simplicity, illustrations of the resin member 36 of the fixed stator 30 shown in FIG. 3 to FIG. 5, the resin member 43 of the moveable stator 40, the crank shaft 51, and the coil 31 etc. are omitted. In addition, in FIG. 7 to FIG. 9, the same members as shown in FIG. 3 to FIG. 5 are denoted with the same reference numerals.

FIG. 7 shows a state when the second teeth 41 of the moveable stator 40 are aligned with the first teeth 34 of the fixed stator 30. In this state, the gap, which generates magnetic resistance, between the end surface 34b at the second teeth 41 side of the first teeth 34 and the end surface 41a at the first teeth 34 side of the second teeth 41 is at its smallest value k (refer to FIG. 5). At this time, magnetic flux is generated in the first teeth 34 and the second teeth 41, the base 42, and each permanent magnet 24. This magnetic flux flows from the end surface 34a of the first teeth 34 at the permanent magnets 24 side to the end surface 34b on the opposite side. In other words, in this state, the magnetic flux flows within the coil 31.

When moveable stator 40 is rotated through the intermediate position shown in FIG. 8 to the position shown in FIG. 9, namely, where the second teeth 41 have rotated to a center position between two neighboring first teeth 34, the gap, which generates magnetic resistance, between the end surface 34b at the second teeth 41 side of the first teeth 34 and the end surface 41a at the first teeth 34 side of the second teeth 41 becomes larger. At this time, the magnetic flux does not flow in the second teeth 41. Instead, the magnetic flux only flows in the permanent magnets 24 and the first teeth 34 in the vicinity of the rotor 21. In other words, the magnetic flux does not flow inside the coil 31, and thus as compared to the state shown in FIG. 7, the magnetic flux flow is weak. In the state shown in FIG. 9, because the magnetic flux flow is weak, the rotating electric machine 20 functions as a rotating electric machine of a low torque high speed type. On the other hand, in the state shown in FIG. 7, the magnetic flux flow is stronger than that shown in FIG. 9, because it flows inside the coil 31, and the rotating electric machine 20 functions as a rotating electric machine of a high torque low speed type.

The drive unit 50 of this embodiment with the above-described structure can use the rotating electric machine 20 to provide an auxiliary drive for the crank shaft 51 that is caused to rotate around the center axis X by the piston. In addition, however, the rotation of the crank shaft 51 caused by the piston can be stopped in the drive unit 51 so that just the drive force of the rotating electric machine 20 is used to run the motorcycle 1.

Note that, in the drive unit 50 of this embodiment, the stator 25 and the rotor 21 are disposed on an extension line of the center axis X of the crank shaft 51. Thus, size reduction as compared to the known technology can be promoted in which the rotating electric machine is connected to the crank shaft using a belt-type continuously variable transmission or the like In addition, in the engine with attached rotating electric machine 50, because the rotor 21 is disposed further to the outside in the vehicle width direction than the stator 25, the cooling fan 65 can be fixed to the rotor 21 and caused to rotate along with the rotor 21. Thus, a structure is provided that makes it easier to cool the engine in the drive unit 50 while promoting size reduction. It also makes it easier to cool the radiator 66 that is disposed to the outside in the vehicle drive unit 50.

Accordingly, the drive unit 50 having an engine with an attached rotating electric machine is extremely easy to mount.

Moreover, the drive unit 50 has a structure in which the stator drive mechanism 80 is attached to the crank case 60, and thus ease of mounting is improved still further.

In addition, in the drive unit 50, the cup shaped rotor 21 covers the gap between the rotor 21 and the stator 25, and thus it is difficult for foreign objects like dirt or the like to enter in to the gap. Accordingly, durability is substantially improved.

Furthermore, the drive unit 50 has a structure in which the permanent magnets 24 are arranged inside the rotor 21, and thus it is possible to reliably reduce the size of the gap h in the center axis X direction between the facing permanent magnets 24 and the magnetic flux generating area 34a. Accordingly, the performance of the rotating electric machine 20 can be fully demonstrated.

In addition, in the drive unit 50, the gap adjustment mechanism formed by the above-described first regulation mechanism and the second regulation mechanism is provided between the crank case 60, the crank shaft 51, the rotor 21, and the stator 25. Thus, it is possible to reliably reduce the occurrence of variation in the gap h in the center axis X direction between the permanent magnets 24 and the magnetic flux generating area 34a, thereby allowing the performance of the rotating electric machine 20 to be reliably demonstrated to an even higher level.

In addition, in the drive unit 50, the fixed stator 30, which has a structure that is more complicated than the moveable stator 40, is fixed to the crank case 60, and thus the moveable stator 40 can be provided so as to be rotatable with respect to the crank case 60 and the fixed stator 30. Accordingly, the device structure of the engine with attached rotating electric machine 50 is simplified.

Furthermore, in the drive unit 50, the cooling fan 65 is fixed in an integrated manner at the outside of the rotor 21 in the vehicle width direction. Thus, the drive unit 50 has a structure that makes it easier to cool the engine and attached rotating electric machine 20 of the drive unit 50 using the cooling fan 65. It is also easier to cool the radiator 66 that is disposed to the outside in the vehicle width direction of the drive unit 50. In addition, as a result of integrally fixing the cooling fan 65 to the rotor 21, which is otherwise lighter than the stator 25, rotational resistance is reduced.

Moreover, in the drive unit 50, the cooling fan 65 intakes air from the lateral (vehicle width direction) side, and blows out air to the outside in the radial direction with respect to the center axis X. Thus, a large intake port, such as intake port 66a may be provided in the lateral extremity of the vehicle drive unit in the vehicle width direction of the motorcycle 1, thereby making it easier to intake cool external air and then to direct the exhausted air to the outside of the motorcycle 1.

In addition, in the drive unit 50, the radiator 66 may be disposed in a fan shroud laterally to the outside of the cooling fan 65 so that cooling fan 65 intakes air through the radiator 66. As a result, the cool external air that is sucked in from the outside in the vehicle width direction by the cooling fan 65 directly hits the radiator 66, thereby improving the cooling effect and improving engine performance.

The drive unit 50 having an engine with an attached axial gap type rotating electric machine may be used as a drive unit for a variety of straddle type vehicles, including motorcycles. Moreover, while an embodiment has been described in connection with the figures above, the invention is not limited to this embodiment, but rather can be modified and adapted as appropriate. Thus, it is to be clearly understood that the above description was made only for purposes of an example and not as a limitation on the scope of the invention as claimed below.

What is claimed:

1. A vehicle drive unit comprising:
an engine including a crank case with a crank shaft operatively disposed therein, the crank shaft being arranged to be driven by a piston to rotate about a center axis;
an axial gap type rotating electric machine attached to the engine, the axial gap type rotating machine comprising:
a rotor fixed to an end of the crank shaft and arranged to extend outside of the crank case, the rotor including a plurality of permanent magnets that are orthogonal to the center axis; and
a stator fixed to the crank case with the crank shaft inserted therethrough, the stator including a magnetic flux generating area that faces the permanent magnets in the axial direction; wherein
the stator includes a first stator that includes first teeth that define the magnetic flux generating area and a second stator that includes second teeth; and
a gap is defined between the first teeth and the second teeth and the stator is arranged such that a thickness of the gap can be varied to vary magnetic resistance of the stator by rotating the second stator around the center axis relative to the first stator so that the second teeth rotate relative to the first teeth.

2. The vehicle drive unit according to claim 1, further comprising a drive mechanism configured to rotate the second stator relative to the first stator.

3. The vehicle drive unit according to claim 2, wherein the drive mechanism is attached to the crank case.

4. The vehicle drive unit according to claim 2 or 3, wherein the rotor is cup shaped and includes a yoke that extends from the crank shaft in a radial direction.

5. The vehicle drive unit according to claim 4, wherein the rotor further includes an outer cylindrical member which extends from an outer periphery edge of the yoke toward the stator and covers at least a section of an outer periphery of the stator.

6. The vehicle drive unit according to claim 5, wherein each of the permanent magnets is disposed inside the rotor.

7. The vehicle drive unit according to claim 1, further comprising a gap adjustment mechanism provided between the crank case, the crank shaft, the rotor and the stator, the adjustment mechanism being configured to determine a gap between the permanent magnets and the magnetic flux generating area in the axial direction.

8. The vehicle drive unit according to claim 7, wherein the gap adjustment mechanism includes a first regulation mechanism that regulates a position in the axial direction of the rotor along the crank shaft, and a second regulation mechanism that regulates a position in the axial direction of the stator relative to the crank case while providing tolerance for positional variation in the axial direction of the rotor.

9. The vehicle drive unit according to claim 8, wherein:
the first regulation mechanism includes a tapered structure and one end of the crank shaft and the rotor are coupled together using the tapered structure; and
the second regulation mechanism includes:
a first bearing support member that is provided in an outer periphery surface of an inner cylindrical member that protrudes from a center of the rotor toward the stator,
a second bearing support member that is provided in an inner periphery surface of the stator
a bearing that is provided between the first and second bearing support members, and
an engagement pin and an engagement hole, respectively, provided in the crank case and the stator, to provide tolerance for mutual movement in the axial direction.

10. The vehicle drive unit according to claim 1, wherein the first stator is fixed to the crank case and arranged to support an end portion of the crank shaft, and the second stator is rotatably provided on the crank case.

11. The vehicle drive unit according to claim 1, further comprising a fan that is integral with the rotor.

12. The vehicle drive unit according to claim 11, wherein the fan intakes air from a side opposite the stator in the axial direction and blows out air in a radial direction with respect to the center axis.

13. The vehicle drive unit according to claim 11 or 12, further comprising a radiator disposed so that the fan intakes air through the radiator.

14. A vehicle drive unit for a straddle-type vehicle, the vehicle drive unit comprising:
an internal combustion engine including a crank case including a crank shaft, the crank shaft being mounted within the crank case so that an extended portion of the crank shaft extends outside of the crank case and the crank shaft can rotate about a center axis; and
an axial gap type rotating electric motor operatively coupled to the extended portion of the crank shaft and arranged along the center axis to facilitate engine size reduction and mounting of the vehicle drive unit on a straddle-type vehicle.

15. A vehicle drive unit according to claim 14, wherein the axial gap type motor comprises:
a stator assembly coupled to the crank case and having the crank shaft inserted therethrough, and
a rotor operatively disposed adjacent the stator assembly such that the stator assembly is arranged to support the rotor which is arranged to support the extended portion of the crank shaft along the center axis, wherein
the vehicle drive unit further comprises a drive mechanism arranged to drive the stator assembly.

16. A vehicle drive unit, comprising:
a crank case;
a crank shaft operatively inserted in the crank case, the crank shaft being driven via internal combustion to rotate about a center axis therein, the crank shaft including an extended portion disposed outside of the crank case;
a stator assembly, the stator assembly comprising a first stator component fixed to the crank case, and a second stator component configured to move relative to the first fixed stator component;
a drive mechanism arranged to drive the second stator component; and
a rotor operatively disposed adjacent the first stator component and being coaxially fixed to the extended portion of the crank shaft along the center axis.

17. The vehicle drive unit of claim 16, wherein the rotor is provided with a plurality of permanent magnets.

18. The vehicle drive unit of claim 17, wherein the permanent magnets are arranged substantially in a circular manner while being orthogonal to the center axis.

19. The vehicle drive unit of claim 18, wherein the first fixed stator component is provided with a plurality of first teeth defined by magnetic cores.

20. The vehicle drive unit of claim 19, wherein the first teeth are arranged substantially in a ring which is concentric with the center axis.

21. The vehicle drive unit of claim 20, wherein a terminal surface of each of the first teeth faces a respective permanent magnet.

22. The vehicle drive unit of claim 21, wherein the terminal surface is a magnetic flux generating area.

23. The vehicle drive unit of claim 20, wherein the second stator component is provided with a plurality of second teeth and a substantially ring-shaped base.

24. The vehicle drive unit of claim 23, wherein the number of the second teeth is equal to the number of the first teeth.

25. The vehicle drive unit of claim 24, wherein the second teeth are arranged substantially in a ring which is concentric with the center axis.

26. The vehicle drive unit of claim 25, wherein the second teeth and the ring-shaped base are molded in resin.

27. The vehicle drive unit of claim 22, wherein a coil is wound around each of the first teeth.

28. The vehicle drive unit of claim 27, wherein each coil is configured to generate magnetic flux when energized.

29. The vehicle drive unit of claim 27, wherein the coils and the first teeth are molded in resin.

30. The vehicle drive unit of claim 16, wherein the first stator component is arranged to support the rotor.

* * * * *